United States Patent [19]

Anderson

[11] Patent Number: 5,496,106
[45] Date of Patent: Mar. 5, 1996

[54] SYSTEM AND METHOD FOR GENERATING A CONTRAST OVERLAY AS A FOCUS ASSIST FOR AN IMAGING DEVICE

[75] Inventor: Eric C. Anderson, San Jose, Calif.

[73] Assignee: Apple Computer, Inc., Cupertino, Calif.

[21] Appl. No.: 355,031

[22] Filed: Dec. 13, 1994

[51] Int. Cl.$^6$ .............................. H04N 5/20; H04N 5/52
[52] U.S. Cl. .......................... 348/255; 348/256; 348/678; 348/679
[58] Field of Search ............................ 348/29, 255, 256, 348/673, 678, 679, 687; 358/174; H01N 5/53, 5/52, 5/20

[56] References Cited

U.S. PATENT DOCUMENTS

| | | | |
|---|---|---|---|
| 4,337,479 | 6/1982 | Tomimoto | 358/37 |
| 4,470,067 | 9/1984 | Mino | 348/679 |
| 5,262,863 | 11/1993 | Okada | 348/679 |

*Primary Examiner*—James J. Groody
*Assistant Examiner*—Sherrie Hsia
*Attorney, Agent, or Firm*—Greg T. Sueoka

[57] ABSTRACT

A system for generating and displaying a contrast false color overlay as a focus assist includes a signal divider, an automatic gain control unit, an adder, a signal reducer and a signal combiner. The signal divider receives a signal representing an image and divides the signal into a red channel signal, a green channel signal and a blue channel signal. The red, green and blue channel signals are input to the signal reducer and respectfully reduced by a percentage value. The reduced Green and Blue channel signals are input to the signal combiner and combined with the output of the adder. A luminance signal is also input or generated from the channel signals and is fed to the automatic gain control unit which produces a contrast signal whose brightness is proportional to the contrast in the image. The contrast signal is input to the adder along with a reduced version of the red channel signal where the two signals are added together, and the output of the adder is provided to the combiner. The output of the combiner is then provided to the output device for display of the image. The present invention also comprises a method for adjusting the display to provide a false color contrast overlay as a focus assist, the method comprising the steps of: receiving a signal representing an image; separating the signal into channels; receiving or generating a luminance signal; producing a contrast signal with an amplitude that varies with the contrast in the image from the luminance signal; reducing the contrast signal; reducing the channel signals; combining the reduced contrast signal with one of the reduced channel signals; and generating an image on the output device using the combined signal and the reduced channel signals.

19 Claims, 11 Drawing Sheets

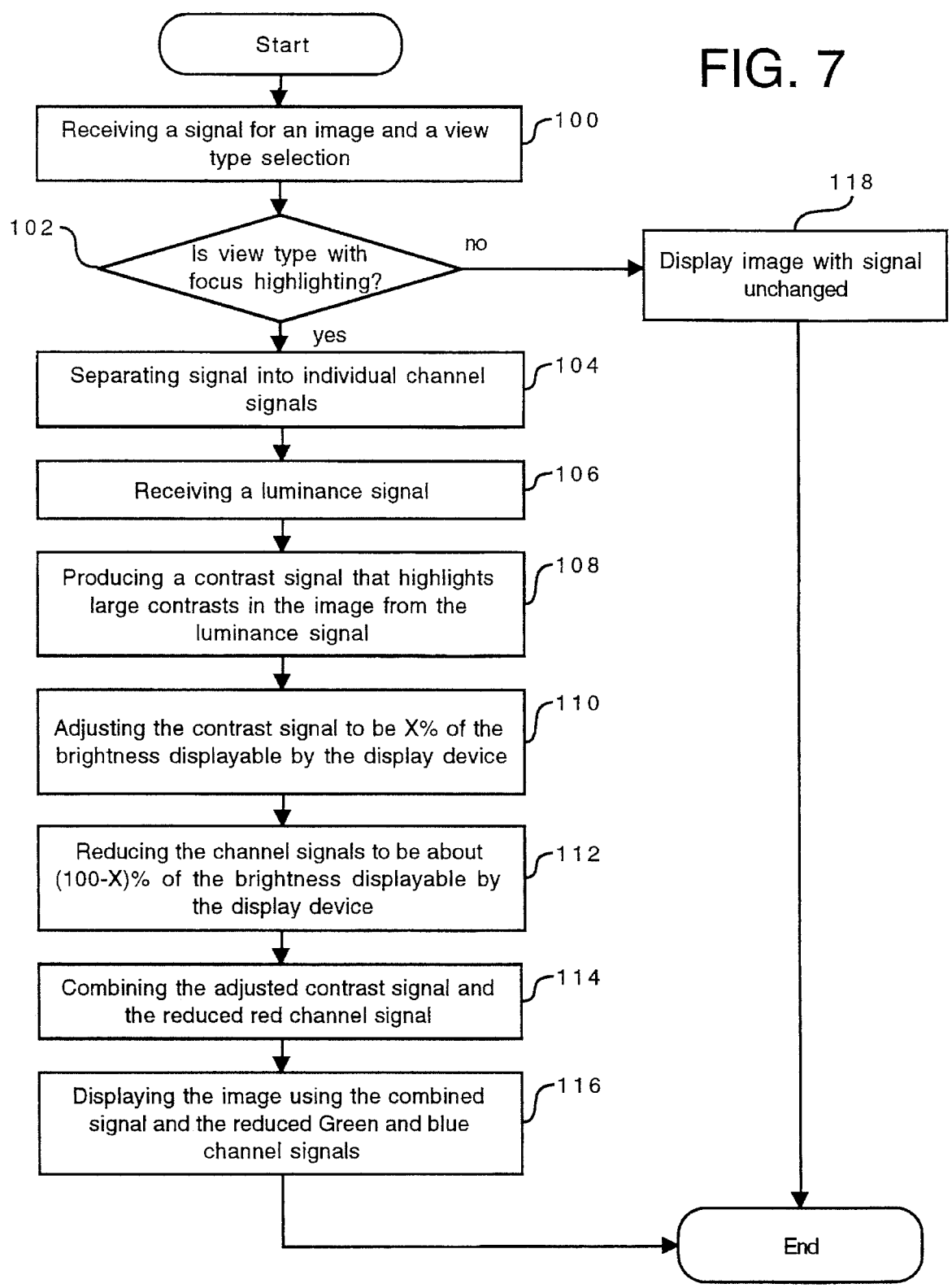

SYSTEM AND METHOD FOR GENERATING A CONTRAST OVERLAY AS A FOCUS ASSIST FOR AN IMAGING DEVICE

BACKGROUND OF THE INVENTION

1. Field of the Invention

The present invention relates generally to electronic imaging systems such as digital cameras. In particular, the present invention relates to systems and methods for providing the user with information as to the portion of an image that is in focus.

2. Description of the Related Art

During the recent past, camera technology has greatly improved. A variety of still cameras are presently commercially available that include such features as an "automatic" focus lens. Such cameras with the automatic focus feature, automatically gather focusing information and adjust the lens of the camera to bring the image received by the camera at the moment the picture is taken into focus. Conventionally, such auto-focus cameras selected predetermined areas in the image to be captured as points that must be in focus. With such cameras, the user is generally not able to view the image through the lens that will gather the image for exposure to the film. Instead, the user views the image or scene through a false lens that is built into the housing of the camera. The scene framed by the false lens generally approximates the image that will be captured on film when the picture is taken. However, a particular problem with such auto-focus cameras is that they do not provide the user with any feedback or information as to the portions of the image that will be in focus when the picture is taken. Since the image is viewed through a false lens, the user must hope the portion of the image of importance is in focus when the picture is taken or hope that the portion of the image of importance falls within an area used by the auto focus mechanism.

Even with cameras that allow the user to view the image to be captured through the current settings of the actual lens, such as a single lens reflex (SLR) camera or a digital camera with a live view finder, identifying the portions of the image that are in focus can be particularly problematic. The image to be captured is typically displayed in a view finder with the image significantly reduced in size. Moreover, the resolution and picture quality of such view finders is very poor. Therefore, when viewing an image to be photographed or captured it is very difficult to identify the portions of the image that are in focus. Because of the poor resolution and small size of the images, in many instances it is not possible to determine the portions of the image that are in focus. This problem is even more significant for digital cameras since ideally, the user will view the image through the view finder for only a few seconds before deciding whether to take the picture, change the view or adjust the focus. Moreover, in the normal use of such cameras, it is very difficult for the user to determine the portion of the image that is in focus, especially when under pressure of the moment to get a picture. It is very common for users, even with SLR and digital cameras, to get out of focus pictures. Thus, there is a need for a system that alerts the user as to the portion of the image that is in focus.

A variety of video cameras for capturing moving pictures of live scenes have been developed and their use is now widespread. Many existing video cameras provide for both the manual and the automatic focusing on images being filmed. Like digital cameras, video cameras typically provide a live view finder. These view finders are also very small, usually less than one square inch. They also suffer from the shortcoming of providing little feedback to the user as to what portions of the scene being filmed are in focus and what portions are not in focus. Therefore, it is very difficult for the user to determine whether an image is satisfactorily in focus using the auto focus mechanisms of the video camera or whether the user should resort to manual adjustment to focus in on the portions of the image as desired. In many instances, the user must view the scene for a significant period of time to ensure that the objects of interest in the scene are in focus. For live action filming, this is a particular problem because the user is not able to quickly adjust the focus as desired to film objects in the scene of interest.

Therefore, there is a need for a system and method for providing the user with feedback as to the portions of an image that will be in focus when the picture is taken. In particular, there is a need for a system and method that displays in a visually distinct manner the portions of an image that are in focus so that they can be readily and quickly identified by the user.

SUMMARY OF THE INVENTION

The present invention overcomes the limitations and shortcomings of the prior art with a system and method for generating and displaying a contrast false color overlay as a focus assist for an imaging device. One embodiment of the system of the present invention includes an imaging device, a signal processing unit, a computer and an output device. The signal processing unit advantageously comprises a false contrast unit having a signal divider, an automatic gain control (AGC) unit, an adder, a signal reducer and a signal combiner. The signal divider receives a signal representing an image and divides the signal into a red channel signal, a green channel signal and a blue channel signal. A luminance signal (for example, the "black & white" video signal, comprising the combination of red, blue, and green) is advantageously input to the automatic gain control unit which produces a contrast signal whose brightness is proportional to the contrast in the image. The Red channel signal is input to the signal reducer where it is reduced in value to ensure that when later combined with contrast signal, the combination is within the brightness range of the output device. The contrast signal is input to the adder along with the reduced version of the red channel signal where the two signals are added together. The green and blue signal divided out by the signal divider are also input to the signal reducer and respectfully reduced in value. The reduced Green and Blue channel signals are input to the signal combiner and combined with the output of the adder. The combined signal is then provided to the output device for display of the image. The signal output by the signal combiner advantageously provides a false color image where the portions of the image that are in focus are highlighted with increased brightness in the red channel. Such an enhanced image allows the user to quickly and easily identify the portion of the image that is in focus.

The present invention also comprises a method for adjusting the display to provide a false color contrast overlay as a focus assist. The preferred method comprises the steps of: receiving a signal representing an image; separating the signal into channels; generating a luminance signal; producing a contrast signal with an amplitude that varies with the contrast in the image from the luminance signal; reducing the contrast signal; reducing the channel signals; combining a reduced contrast signal with the reduced selected channel signal; and generating an image on the output device using the combined signal and the reduced channel signals.

BRIEF DESCRIPTION OF THE DRAWINGS

FIG. 7 is a flowchart of the preferred method for adjusting the display to provide a false contrast overlay as a focus assist.

DETAILED DESCRIPTION OF THE PREFERRED EMBODIMENTS

Figure 1:
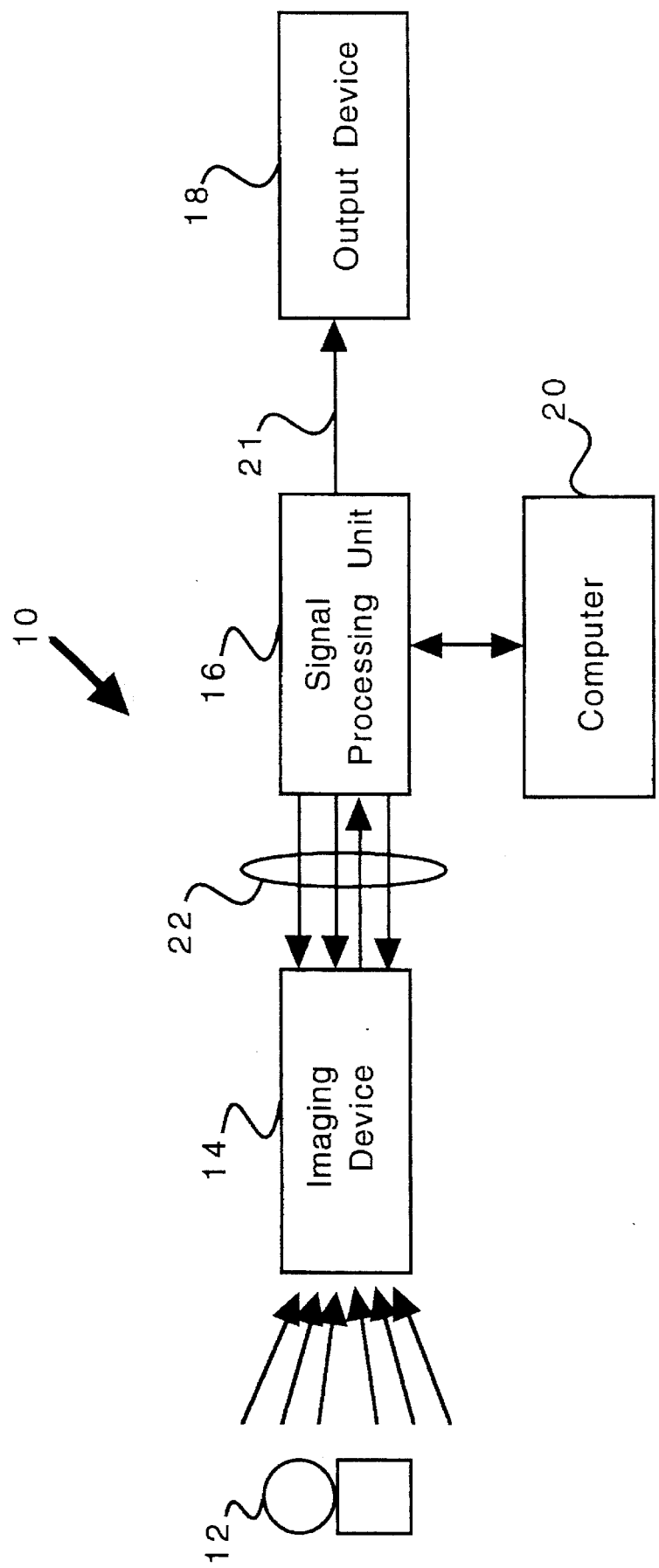
FIG. 1 is a block diagram of a preferred embodiment of the system of the present invention for generating a false contrast overlay as a focus assist for an imaging device.

Referring now to FIG. 1, a block diagram of a system 10 for generating a false contrast overlay as a focus assist is shown. The system 10 is used to capture an image of an exemplary object 12. The system 10 built in accordance with the present invention preferably comprises an imaging device 14, a signal processing unit 16, an output device 18, a computer 20 and an electronic interface 22. An image is captured by the imaging device 14, and the imaging device 14 produces an electrical signal representing the image. The imaging device 14 is coupled by the electronic interface 22 to the signal processing unit 16. The electronic interface 22 is used by the imaging device 14 to send signals representing images to the signal processing unit 16, and by the signal processing unit 16 for sending control signals back to the imaging device 14. The signal processing unit 16 is coupled to the output device 18 by a line 21 for displaying to the user the image received by the imaging device 14 and transformed by the signal processing unit 16. The output device 18 is preferably an active matrix, liquid crystal display, and produces a live viewfinder image. However, those skilled in the art will realize that the output device 18 could be any variety of other types of conventional display devices such as a flat panel display or a CRT. The output device 18 may also include LEDs or other types of lights as status indicators. The signal processing unit 16 is also coupled to the computer 20 to store images gathered by the imaging device 14 and for further processing and display of such images.

Figure 2:
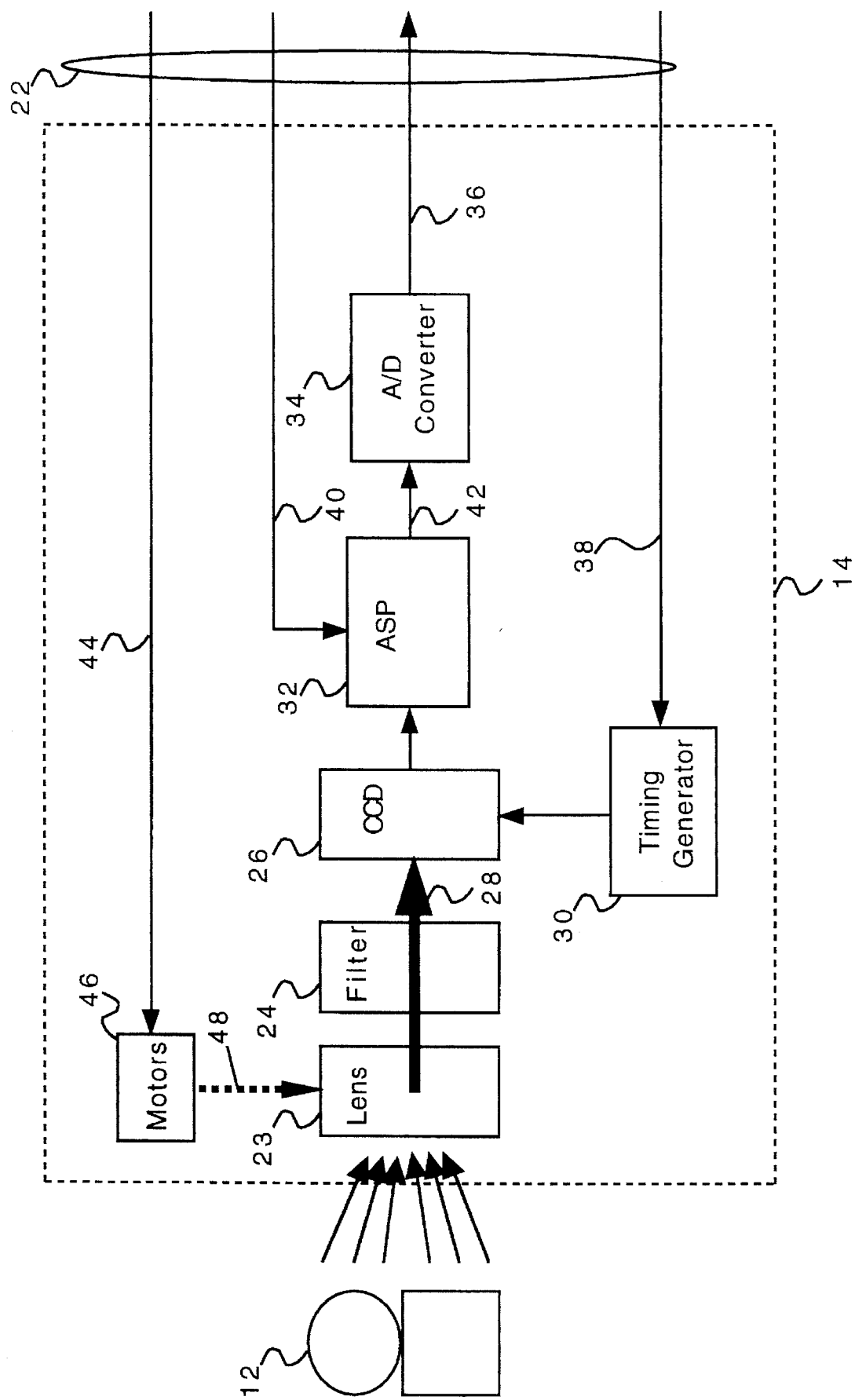
FIG. 2 is a block diagram of a preferred embodiment of the imaging device of the present invention.

Referring now to FIG. 2, the imaging device 14 is shown in more detail. The imaging device 14 preferably comprises a lens 23 having an iris, a filter 24, an image sensor 26, a timing generator 30, an analog signal processor 32, an analog-to-digital (A/D) converter 34 and one or more motors 46. Light passes from the object 12 along an optical path 28 through the lens 23 and the filter 24 to the image sensor 26. The lens 23, the filter 24 and the image sensor 26 are preferably disposed in succession coaxially along the optical path 28. The lens 23 is preferably a close-up lens and a fixed focus lens, however, lens 23 could be any plurality of lens providing for adjustment to focus on different parts of the image received, as will be understood to those skilled in the art. The filter 24 preferably includes an infrared filter and an ultraviolet filter such that visible light is passed to the image sensor 26, while wavelengths of infrared and ultraviolet light are absorbed. The filter 24 may also include optical low and high pass filters of various wavelengths of visible light as known to those skilled in the art. Additionally, the filter 24 preferably includes a "color filter array" on the image sensor 26 for receiving a color image. Those skilled in the art with realize that alternatively, a beam splitter and 3 separate CCD sensors, one for each color, may be used.

The image sensor 26 is disposed in coaxial alignment with the optical path 28, and is positioned to receive filtered light containing image data from the filter 24. Filtered light is received by the image sensor 26 which is preferably a charge coupled device (CCD) that records image data as an array of analog voltages. The image sensor 26 measures the illumination of the filtered light on a pixel by pixel basis, and outputs a two-dimensional array of corresponding analog voltages to the analog signal processor 32. The image sensor 26 is coupled to the timing generator and driver 30 that provides signals for reading out the analog voltages from the CCD 26. The timing generator and driver 30 includes an internal clock and other control circuitry, that periodically directs the image sensor 26 to receive image data corresponding to the object 12 and output the data to the analog signal processor 32. The timing generator and driver 30 also has an input coupled to receive control signals on a line 38 of the electronic interface 22. The control signals applied to line 38 specify the focus, exposure and balance by indicating the frequency at which the data in the image sensor 26 is output and essentially provide exposure control. The control signals include signals setting the exposure time and the modes of the sensor 26 (i.e., flush sensor in preparation for image capture, expose image, shift image data array, etc.) These signals are used as in conventional video cameras to sample the image at a single, fixed rate (60/sec for NTSC), or as in digital still cameras were the sampling rate can have several "rates" of capture, or can do it "one at a time". Also, the control signals provide for sub-sampled capture (such as every other line, or every other line pair, etc.,) for collecting data to focus and set exposure, where basic image information is needed but the computational expense of gathering and processing full image data is not required.

The analog signal processor 32 has a data input, a control input and a data output. The data input is coupled to the output of the image sensor 26 to receive the image data. The control input is coupled to line 40 of the electronic interface 22 for receiving control signals to specify how the analog signal processor 32 will manipulate the image data received from the image sensor 26. One such control signal provides gain control for the ASP (AGC circuitry in DSP or computer feed back to set gain). For example, typical operations that the analog signal processor 32 will perform include double correlated sampling (DCS), dark level clamping, level shifting, gain control, and other industry standard signal conditioning techniques designed to improve the quality of the data captured by the A/D. Once the image data has been processed by the analog signal processor 32, it is output on line 42. The output of the analog signal processor 32 is coupled by line 42 to the input of the A/D converter 34 to provide the analog image signals. The A/D converter 34 converts the analog voltages to corresponding digital values, on a pixel by pixel basis, and outputs the digital array on line 36 to the signal processing unit 16.

The imaging device 14 also includes one or more motors 46 for controlling the position of the lens 23 from the image sensor, its focus and the size of an iris that is part of the lens 23. In an exemplary embodiment, the motors 46 include a focus motor, an iris motor and a zoom motor. The exposure is adjusted by changing the exposure time (sampling rate of time generator 30), the ASP gain (gain of analog signal processor 32), and the iris (iris motor). The focus of the image on the image sensor 26 is modified using the focus motor and any zooming is controlled by moving the lens 23 or some lens elements with respect to the image sensor 26 using the zoom motor. The motors 46 are preferably a conventional type known in the art. The motors 46 are coupled to line 44 to receive signals for controlling the focus motor, the iris motor and the zoom motor. For ease of understanding the effect of the motors on the lens 23 that includes an iris is shown by the dashed line 48.

Figure 3:
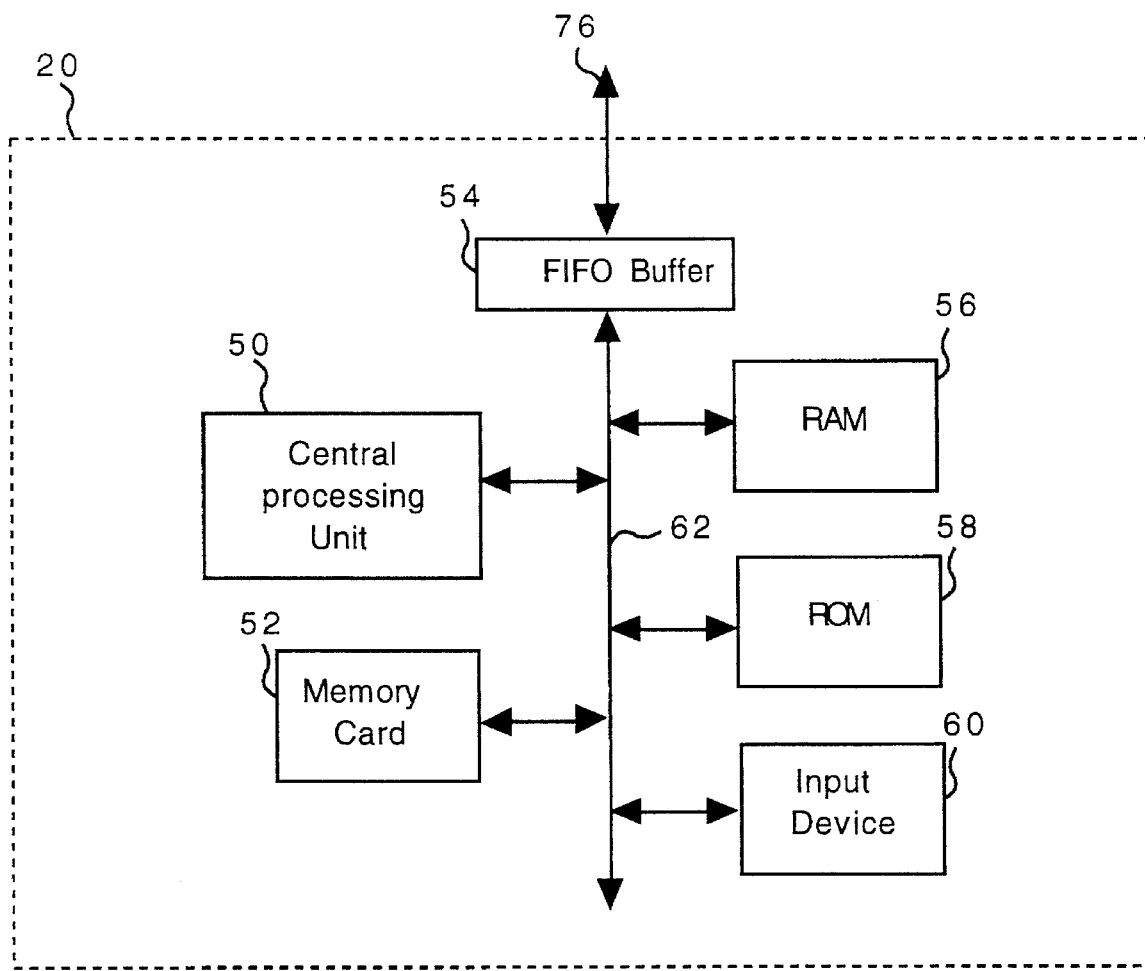
FIG. 3 is a block diagram of a preferred embodiment of a computer of the present invention.

Referring now to FIG. 3, the computer 20 is shown in more detail. The computer 20 preferably comprises a central processing unit (CPU) 50, a memory card 52, a buffer 54, random access memory (RAM) 56, read-only memory 58, and an input/output device 60. The central processing unit (CPU) 50, the memory card 52, the RAM 56, the ROM 58, and the input/output device 60 are coupled in a von Neuman architecture via a bus 62. In a first and preferred embodiment, the computer 20 is embedded as part of the system 10 similar to computers in digital cameras. The central processing unit 50 is preferably a microprocessor such as a Motorola 68040. The RAM 56 preferably forms a frame buffer and also includes work space for processing the image data. Additional memory may be provided through the use of the memory card 52, which preferably includes flash memory. The ROM 58 stores an operating system, start up information, programs for processing the raw data from the CCD 26 into first fully interpolated and color corrected images and then compressed images, and other predetermined routines.

The input/output device 60 is preferably a series of control buttons for selecting an operating mode for the output device 18 such as between normal view and focus assist view. Additional control buttons or mechanisms might also be included for adjusting the focus and other operating parameters of the imaging device 14. For example, the input/output device 60 includes function buttons, such as shutter buttons, focus and zoom buttons, mode setting buttons, LCD panels, etc. These inputs are processed by the CPU 50 under direction and control of routines stored in RAM 56 and/or ROM 58, and the operating system stored in ROM 58. The CPU 50 generates control signals that are provided to the imaging device 14 via line 76 through the signal processing unit 16 and the electronic interface 22. The computer 20 is preferably coupled by line 76 to the signal processing unit 16. Via line 76, the computer 20 is able to receive image data for images captured and processed by the imaging device and signal processing unit 16, respectively. The buffer 54 is preferably a first-in, first-out buffer for temporarily storing image data. The buffer 54 has inputs that are coupled to line 76. The outputs of the buffer 54 are coupled to the bus 62 for transmitting image data on the bus 62. The buffer 54 also provides for the transmission of control signals to the signal processing unit 16. For this application, the buffer 54 has inputs coupled to the bus and outputs coupled to line 76.

In a second and alternate embodiment, the computer 20 may be a desktop type computer. In such a case, the input/output device 60 also includes a keyboard and mouse type controller. In the second embodiment, the computer 20 is a Macintosh Quadra 800 computer. Those skilled in the art will realize that the computer 20 could also be implemented on an IBM personal computer. Those skilled in the art will further realize that the in the second and alternate embodiment the work space, programs and routines are stored in RAM as opposed to being stored ROM in the embedded computer case (the preferred embodiment).

Figure 4:
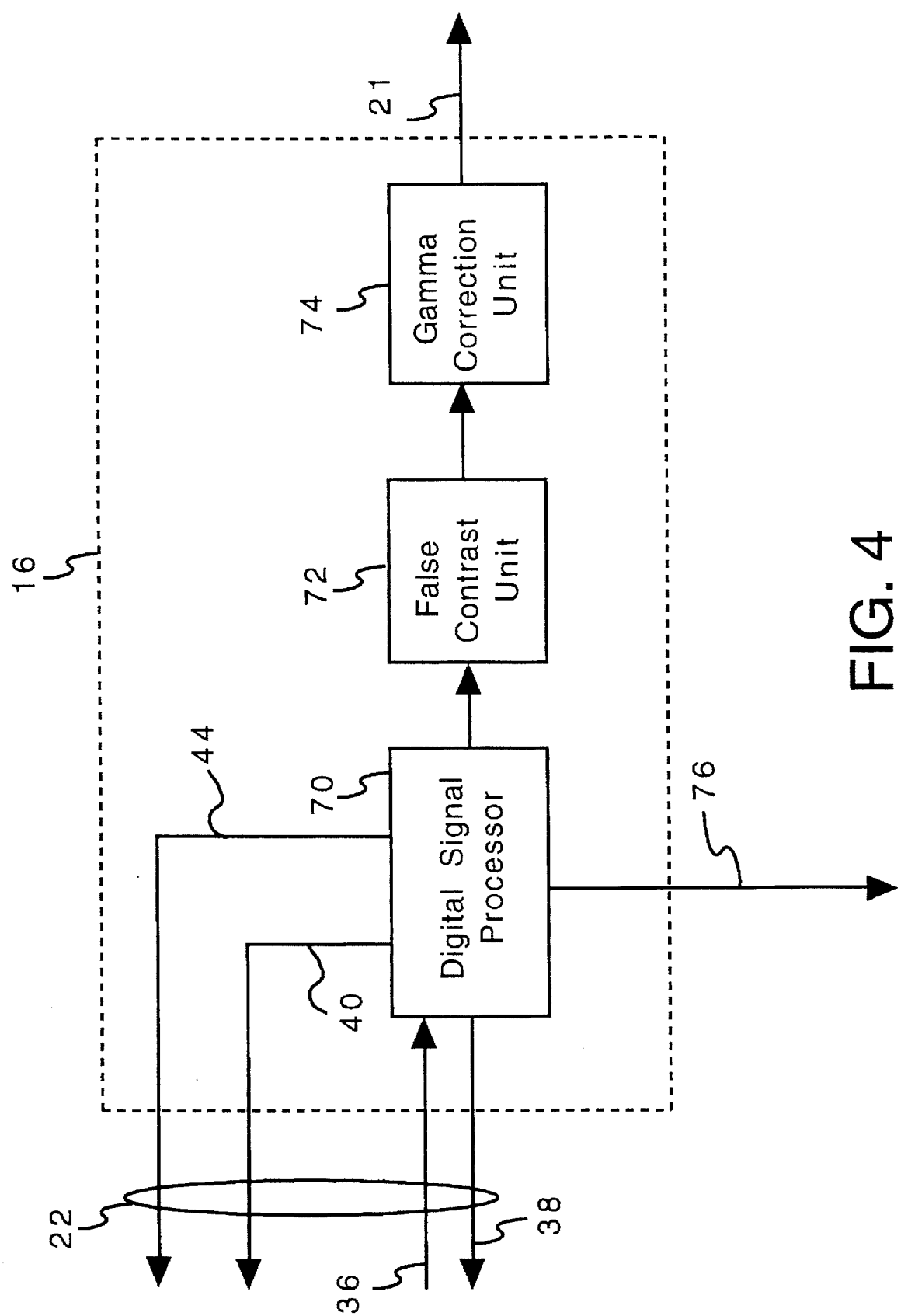
FIG. 4 a block diagram of a preferred embodiment of signal processing unit of the present invention.

Referring now to FIG. 4, one embodiment of the signal processing unit 16 will be described. While the preferred embodiment of the signal processing unit 16 will now be described with reference to specialized hardware, those skilled in the art will understand that the functions of the signal processing unit 16 could be performed by the computer 20 using specialized software if the CPU 50 is fast enough, or if viewfinder update rate can be slower than video "real time." The signal processing unit 16 preferably comprises a digital signal processor 70, a false contrast unit 72 and a gamma correction unit 74. The digital signal processor 70 is preferably coupled to the electronic interface 22 and has an input coupled to line 36 for receiving the image data produced by the imaging device 14. The digital signal processor 70 also has outputs coupled to lines 38, 40 and 44 of the electronic interface 22 for controlling the focus, balance and exposure for the image captured by the imaging device 14. The digital signal processor 70 also has inputs and outputs coupled to a bi-directional line 76 for communicating with the computer 20. The signal processing unit 16 is preferably constructed as an application specific integrated circuit (ASIC) with the functionality described below. Thus, while the signal processing unit 16 will now be described as including the false contrast unit 72 and the gamma correction unit 74, these functions may be performed by the digital signal processor 70 and its associated memories and registers with the appropriate routines and data stored therein.

The digital signal processor 70 receives image data in the form of an array of digital pixel values from the imaging device 14. The digital signal processor 70 processes these digital pixel values in a conventional manner and applies color corrections and other transformations to the input image data such as for resolution adjustment and for transforming the data to different color spaces. The digital signal processor 70 also process the image data to provide a variety of statistics such as luminance, chrominance and focus in a conventional manner. The focus statistics preferably include contrast information. These statistics are also used in a conventional manner to produce the control signals applied on lines 38, 40 and 44 of the electronic interface 22. Essentially, the digital signal processor 70 produces a stream of bits that can be utilized by the output device 18 (i.e., video data of an appropriate format) from the two-dimensional array of digital pixel values received from the imaging device 14. The data from the image sensor 26 is preferably color space sub-sampled (i.e., only one color per pixel is sampled). Thus, the digital signal processor 70 reconstructs a full set of color values for each pixel, either RGB, CMY, or YCC/YUV, depending on the desired output format.

The digital signal processor 70 has an output coupled to the false contrast unit 72 for providing image data. The data can also be output on line 76 and then be stored in the buffer 54 of the computer 20 for additional processing as desired. The digital signal processor 70 is also coupled to receive input control signals from the computer 20 along line 76. In an alternate embodiment, the signal processing unit 16, in particular the digital signal processor 70, may be connected directly to one or more buttons for inputting signals to control the focus and the type of display presented to the user, either normal view or a view with a contrast overlay highlighting the areas in focus.

The digital signal processor 70 also outputs the stream of bits that will produce the image on the output device 18 to the false contrast unit 72. The false contrast unit 72 reduces the brightness of the signal received and superimposes a signal whose brightness is proportional to the contrast in the image. This effectively produces a false color image over the viewfinder image, with the areas that are in focus highlighted with the false color image. Since the output device 18 has a limited brightness range, the brightness of the original signal is reduced by 50%, for example, and the false color image is limited to a brightness range of 50% of the output device 18, for example, in the preferred embodiment described below. However, those skilled in the art will realize that the percentage contribution of the original signal and the false overlay signal are adjustable by the user. For example, the brightness of the original signal might be reduced by 25% and the false color image limited to a brightness range of 25% of the output device 18.

Once the image signal has been processed by the false contrast unit 72, it is sent to the gamma correction unit 74 for additional processing before display. The false contrast unit 72 outputs the stream of bits to the gamma correction unit 74. The gamma correction unit 74 applies a conventional gamma correction and the data is output by the gamma correction unit 74 on line 21. Gamma is a standard non-linear adjustment of the intensity of the data to compensate for the characteristics of the display device. Data from the image sensor 26 typically has a gamma of 1.0 - linear. Typical CRT monitors require a gamma of about 1.8 to 2.3. Thus, output of the image sensor 26 is corrected by the gamma correction unit 74 according the needs of the output device 18 so that the data is displayed correctly for viewing. The output of the gamma correction unit 74 is provide on line 21 to the output device 18. Those skilled in the art will realize that in alternate embodiment the gamma correction unit 74 may be coupled between the digital signal processor 70 and the false contrast unit 72.

Figure 5:
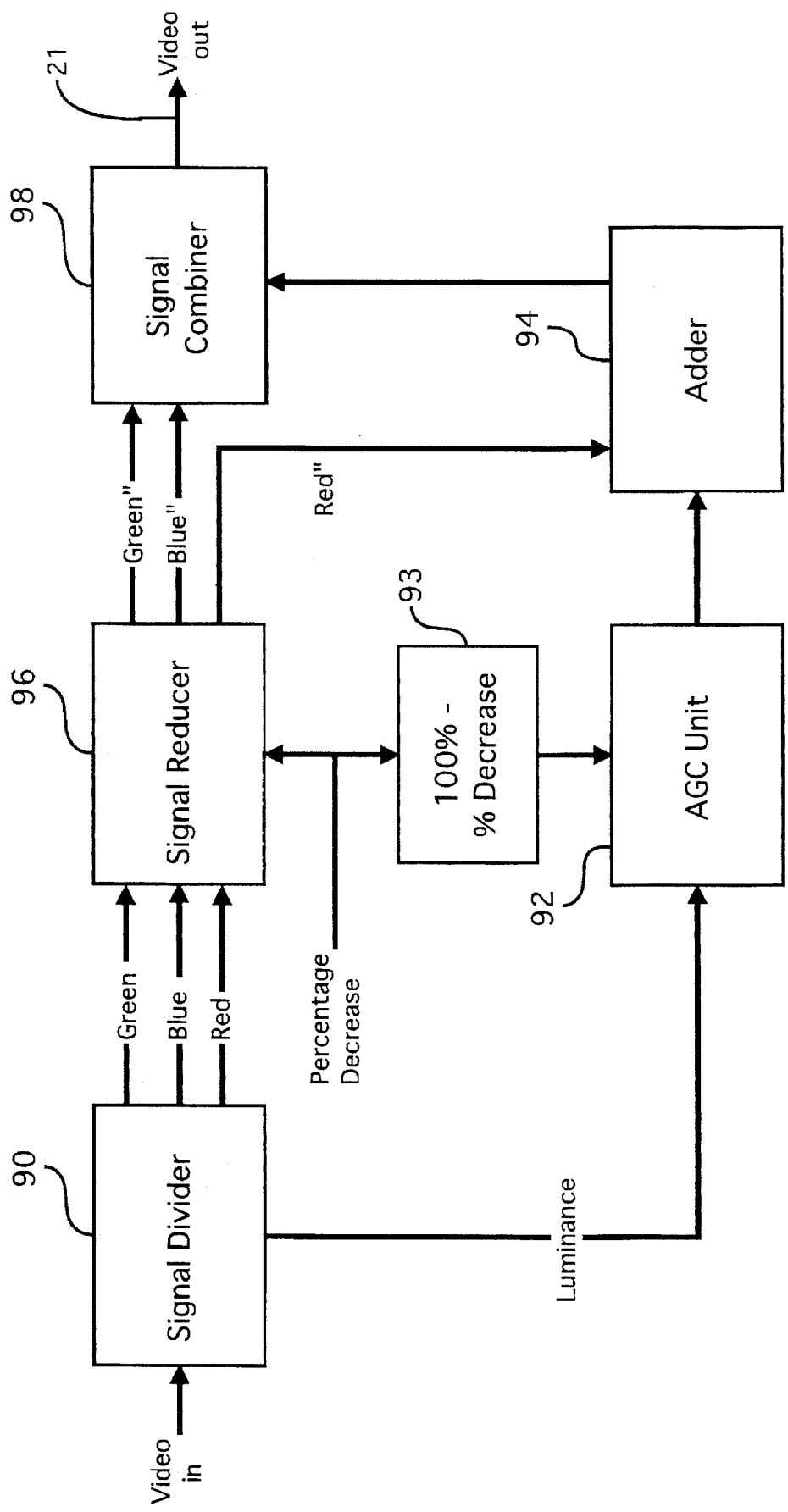
FIG. 5 is a functional block diagram of a first embodiment of a false contrast unit of the present invention.

The false contrast unit 72 will now be described with reference to the functional block diagram of FIG. 5, however, as was noted above, these functions are preferably performed by the digital signal processor 70 and its associated memories and registers. Nonetheless, the false contrast unit 72 could be constructed of dedicated hardware components in an alternate embodiment. The false contrast unit 72 preferably comprises a signal divider 90, an automatic gain control (AGC) unit 92, an adder 94, a signal reducer 96, and a signal combiner 98. The signal divider 90 has an input that receives the stream of bits representing the image from the digital signal processor 70. The signal divider preferably divides the signal into the channels comprising the signal. While the present invention will now be described with respect to an RGB color space, those skilled in the art will understand that the present invention may also operate in other color spaces such as CMY or YUV. In the preferred embodiment, the stream of bits represents the image in a RGB format, and is divided in a conventional manner into a Red channel signal, a Blue channel signal and a Green channel signal. The signal divider 90 provides three outputs each providing a respective channel signal. These three outputs of the signal divider 90 are coupled to corresponding inputs of signal reducer 96. A fourth output of the signal divider 90 provides a luminance signal and the fourth output is coupled to an input of the AGC unit 92. In an exemplary embodiment, the luminance signal is the Y value in YCC/YUV systems, or can be computed from the RGB or CMY values. The green value can be used as a good approximation for Y.

The signal reducer 96 preferably has three data inputs: one for receiving the Green channel signal from the signal divider 90, one for receiving the Blue channel signal from the signal divider 90, and one for receiving the Red channel signal from the signal divider 90. The signal reducer 96 preferably reduces the intensity of each channel signal by a percentage. The percentage is adjustable by the user using a percentage decrease signal applied to the control input to the signal reducer 96. The percentage decrease signal can be produce by a control knob or button that is part of the input/output device 60. Those skilled in the art will realize the percentage may be varied according to the amount of intensity or highlighting that is desired for the false contrast overlay. Thus, the signal applied to the first input of the signal reducer 96, the Green signal, is reduced in intensity by a percentage, and provided on the first output of the signal reducer 96 as the Green" signal. Similarly, the signals applied to the second and third inputs of the signal reducer 96, the Blue and Red signals, are reduced in intensity by the same percentage, and provided on the second and third outputs of the signal reducer 96 as the Blue" and Red" signals, respectively. The signal reducer 96 operates in a conventional manner to reduce the intensity of each channel signal such as for example by performing a right shift by half the number of bits defining the intensity for a 50% reduction. In an alternate embodiment, the signal reducer 96 includes a shift register for performing such a right shift operation.

The input of the AGC unit 92 is coupled to the signal divider 90 to receive a luminance signal. The AGC unit 92 controls the gain of over an entire frame. More specifically, the gain is set by the output signal from the conversion circuit 93 so that the peak value for an entire frame is at the level required. The AGC unit 92 preferably performs two operations on the input luminance signal. First, the signal is filtered such as by using a conventional FIR or IIR high-pass filter. In an exemplary embodiment, the absolute value of the signal is also taken. The filter receives the signal and produces an signal whose intensity is proportional to the contrast in the image. (i.e., proportional to the absolute value of the rate of change in the signal). For example, the greater the contrast between adjacent pixels of the image, the greater the intensity of the signal. Second, the signal output by the filter is the provided to an automatic gain control circuit where the gain on the signal output by the filter is limited so that when added to the output of the signal reducer 96, the sum totals 100%. In one embodiment, the "percentage decrease" signal applied to adjust the amount the signal reducer 96 reduces the divided video signal is also input to a conversion circuit 93. The conversion circuit 93 translates the "percentage decrease" signal into a signal that controls the gain of the AGC unit 92. The conversion circuit 93 effectively subtracts the "percentage decrease" signal from 100% to determine the range to which the gain of the AGC unit 92 should be limited. The input of the conversion circuit 93 is coupled to receive the "percentage decrease" signal and the conversion circuit 93 has an output that is coupled to the gain control input of the AGC unit 92. Thus, when the output of AGC unit 92 is summed with the output of the signal reducer 96, the resulting signal is sure to be within the useful range of the output device 18. For example, if the signal reducer 96 reduces the channel signals by 50%, the automatic gain control circuit will control the gain on the signal output by the filter such that it does not exceed 50% of the intensity range of the output device 18. Similarly, if the signal reducer 96 reduces the divided signals to 33%, then the AGC unit 92 is limited to 67%. Those skilled in the art will realize that the automatic gain control circuit can limit the output of the AGC unit to a variety of intensity ranges. Once the signal has been processed by the automatic gain control circuit, it is output by the AGC unit 92.

In an alternate embodiment of the present invention, the AGC unit 92 receives a contrast signal from contrast circuitry in the digital signal processor 70. Such a contrast signal from contrast circuitry is conventionally used to control the focusing of the imaging device 14. If such a contrast signal is available, the filter may be eliminated and the contrast signal provided directly to the input of the automatic gain control circuit, which operates as has been described above.

The output of the AGC unit 92 is coupled to a first input of the adder 94. The second input of the adder 94 is coupled to the third output of the signal reducer 96 to receive the Red" signal. The adder 94 sums the signals applied to its first and second inputs, and outputs the sum on its output. The output of the adder 94 is coupled to a first input of the signal combiner 98. The second and third inputs of the signal combiner 98 are coupled to the first and second outputs of the signal reducer 96 to receive the Green" signal and the Blue" signal, respectively. The signal combiner 98 merges the three signals applied to its inputs to generate a signal in RGB format that can be used by the output device 18. The signal combiner 98 operates in a conventional manner performing effectively an inverse function of that performed by the signal divider 90. The resulting combined signal is output on line 21 and provides a view of the image gathered by the imaging device 14, but reduced in intensity and having a false contrast overlay on the red channel. The resulting output device 18 will show bright red, for the preferred embodiment, around the edges of the objects that are in focus in the image. Less well focused objects will have less red highlights, and out of focus object will have no red highlighting. This additional highlighting in the image produced on the output device 18 advantageously allows the user to quickly and easily identify what an portions of an image are used by an auto focus mechanism, and whether any manual adjustment to the focus is necessary.

While the preferred embodiment of the present invention only produces a false contrast overlay for the Red channel (i.e., red highlighting), those skilled in the art will realize that various other channels or combinations of channel signals may be used to provide highlighting. Alternatively, the blue channel or the green channel may be used processed through the AGC unit 92 and the adder 94 instead of the Red channel in a similar manner as has been described above to produce a blue or green contrast overlay. Yet another embodiment, might use a combination of channels such as the red and blue channels and provide an AGC unit and an adder for each channel with similar couplings as described above for the red channel.

Figure 6:
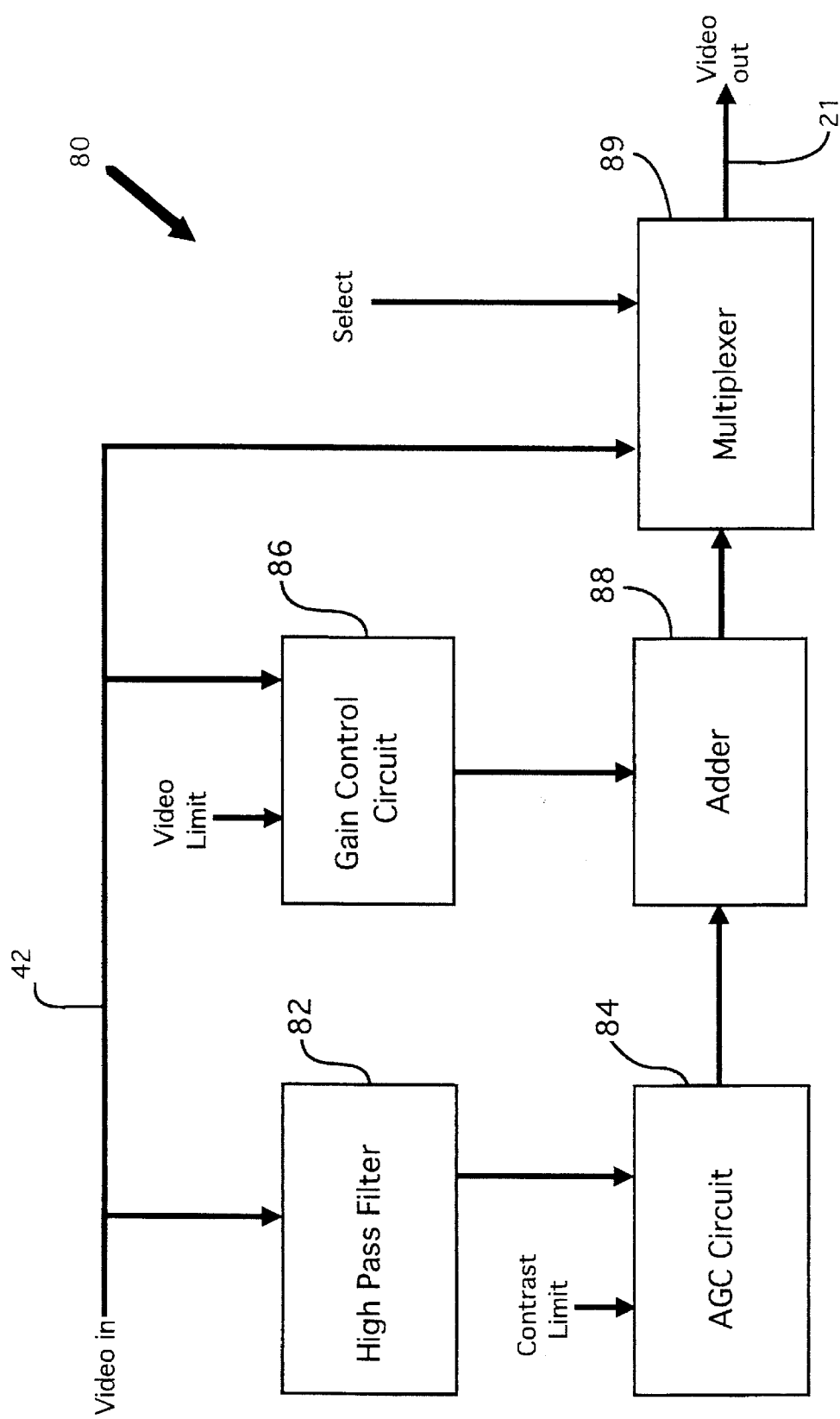
FIG. 6 is a block diagram of a second embodiment of the false contrast unit of the present invention.

Referring now to FIG. 6, a second embodiment 80 of the false contrast unit is shown. This second embodiment 80 of the false contrast unit preferably comprises a high pass filter 82, an AGC circuit 84, a gain control circuit 86, an adder 88 and a multiplexer 89. The second embodiment 80 of the false contrast unit is designed for an analog camera with a real-time (live) viewfinder such as a conventional camcorder. An video signal is received on line 42, such as from the analog signal processor 32 after being processed in a conventional analog manner to convert the CCD data to video as in an analog video camera. Line 42 is preferably coupled to an input of the high pass filter 82, an input of the gain control circuit 86 and a first input of the multiplexer 89. The high pass filter 82 is a resistor capacitor combination as known to those skilled in the art. The high pass filter 82 differentiates the Y from the input video signal to extract the high frequency components (contrast extraction) and produce a contrast signal. The contrast signal is output by the high pass filter 82 which has its output coupled to the input of the AGC circuit 84. The AGC circuit 84 is a standard automatic gain control circuit and properly adjusts the contrast signal to the operating parameters of the output device 18. The amplitude of the signal sent to the output device 18 is set for the most pleasing appearance in the viewfinder. This setting is a ratio of the contrast signal to the video signal. In an exemplary embodiment, this ratio is adjustable by the user and set applying the desired values for a video limit signal to the gain control circuit 86 and a contrast limit signal to the AGC circuit 84. Again, as in the digital embodiment, the user may set the ratio of contrast signal to video to maximize the parameters of the output device such as setting the video limit signal to be X% and setting the contrast limit signal to be (100–X)%. The output of the AGC circuit 84 is applied to a first input of the adder 88. The other input of the adder 88 is provided by the output of the gain control circuit 86. The gain control circuit 86 reduces the gain of the video signal and along with the AGC circuit 84 maintains the desired ratio of contrast signal to video signal. The adder 88 sums the two signals applied to its inputs and provides its output to a second input of the multiplexer 89. The first input of the multiplexer 89 is coupled to line 42 to receive the original video signal, as noted above. The multiplexer 89 also has a selection input coupled to receive a control signal either from a user selection button or from the processor in response to camera software. Thus, by asserting a signal on the selection input of the multiplexer 89, either a normal view with the video signal unchanged is output or a focus assist view with highlighting for the areas in focus is output. Those skilled in the art will realize that the multiplexer 89 may be eliminated in an alternate embodiment, and that an unmodified video signal could be output by the adder 88 directly by setting the contrast limit signal to 0%, thus, setting the gain of the contrast signal to 0 and setting the video limit signal to 100%, thus, setting the gain of the video signal to 1.

Referring now to FIG. 7, a flow chart of the preferred method for adjusting the display to provide a false contrast overlay as a focus assist is shown. The preferred method begins in step 100 by receiving a signal representing an image and view type selection. Next in step 102, the method determines whether the view type selection includes focus highlighting. If the view type selection does not includes focus highlighting (the user selected a normal view), then the method proceeds to step 118. In step 118, the image is displayed on the output device 18 using the signal that was received in step 100 and then the method ends. However, if the view type selection is with focus highlighting then the method continues in step 104. In step 104, the method separates the signal received in step 100 into its constituent channel signals. Then in step 106, a luminance signal is received or is generated from the channel signals. For the preferred method, a luminance signal is received as part of the input. Alternatively, the green channel can be used if it has sufficient bandwidth. Next in step 108, a contrast signal that highlights the large contrasts in the image is produced from the luminance signal. In step 110, the method adjusts the contrast signal to range between a percentage, X, of the brightness displayable by the output device 18. In the preferred embodiment, the contrast signal ranges between 0% and 100%. Then in step 112, each of the individual channel signals is reduced or adjusted to be about a percentage of (100%–X) of the brightness displayable by the output device 18. In step 114, the adjusted contrast signal produced by step 110 and the reduced selected channel signal produced by step 112 are combined. This combination is preferably accomplished by adding the adjusted contrast signal produced in step 110 to the reduced red channel signal produced in step 112. While the Red channel is used in the preferred embodiment, those skilled in the art will realize that other channels such as Blue or Green or combinations there of may be used. Finally in step 116, the image is displayed using the combined signal from step 114 and the reduced versions of the blue and green channels from step 112.

Figure 8A:
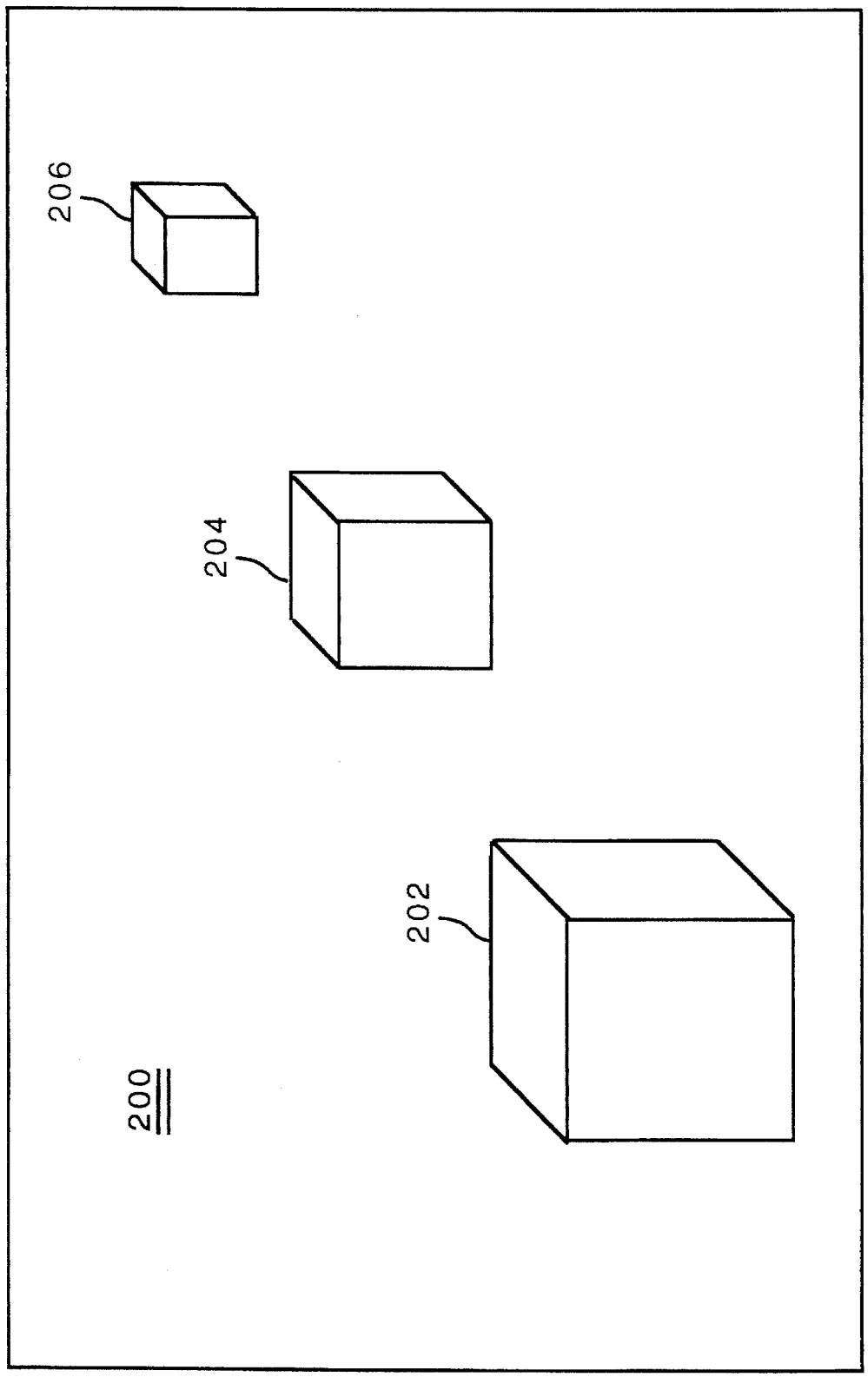
FIG. 8A is a graphical representation of a screen of the output device showing an image in a normal view.
Figure 8B:
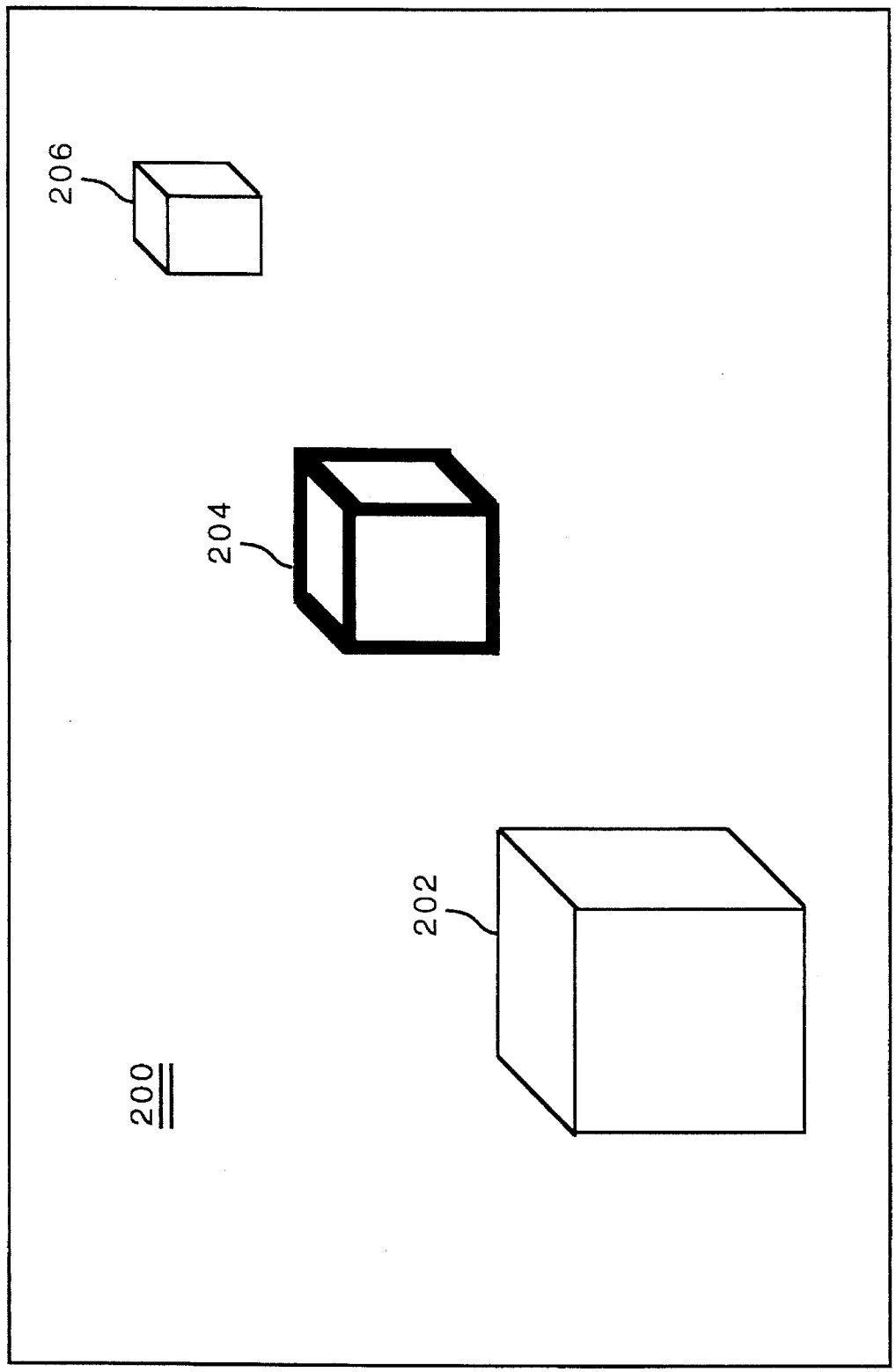
FIGS. 8B, 8C and 8D are graphical representations of the screen of the output device showing an image with a false contrast overlay according to the present invention to identify the area of the image that is in focus.
Figure 8C:
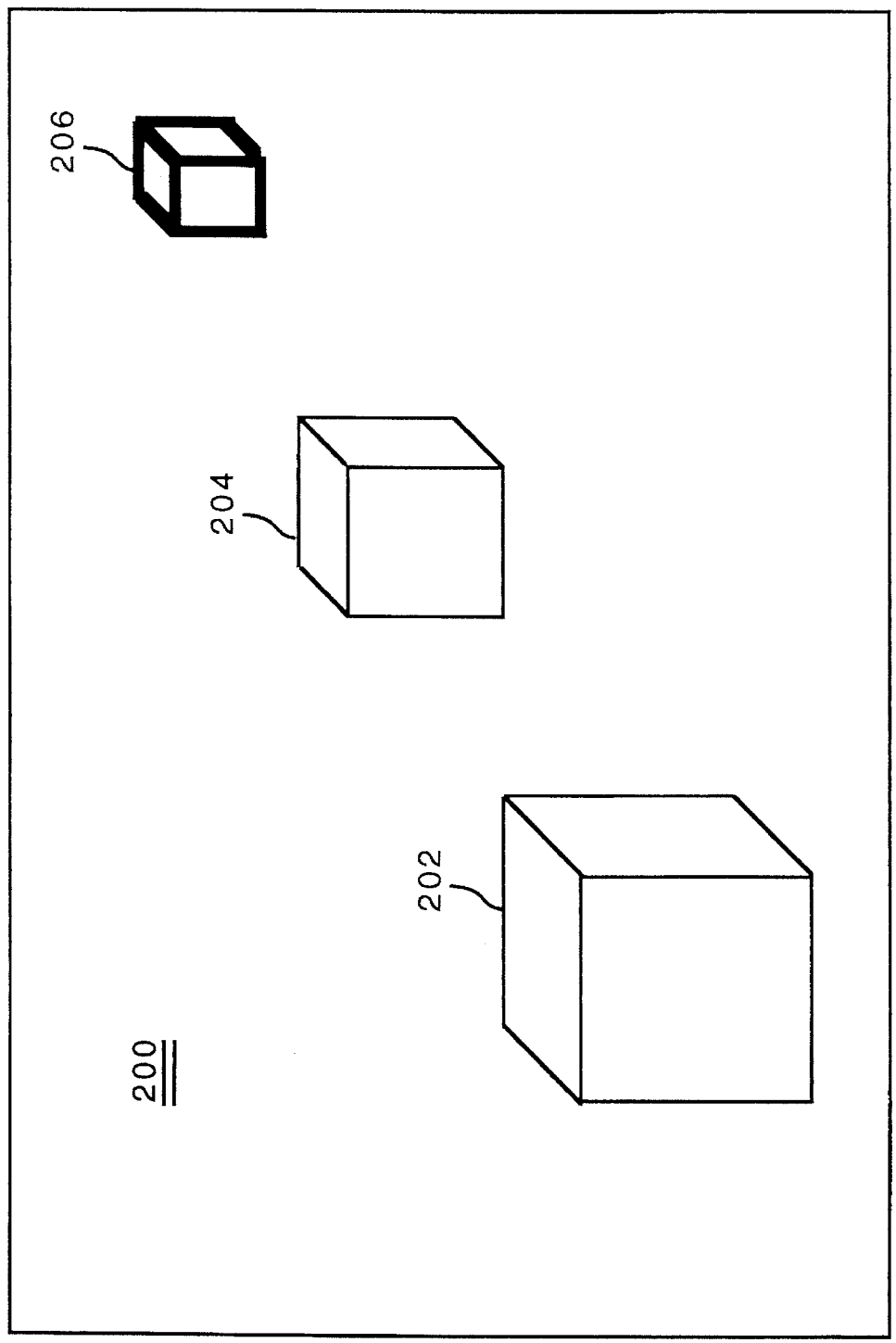
Figure 8D:
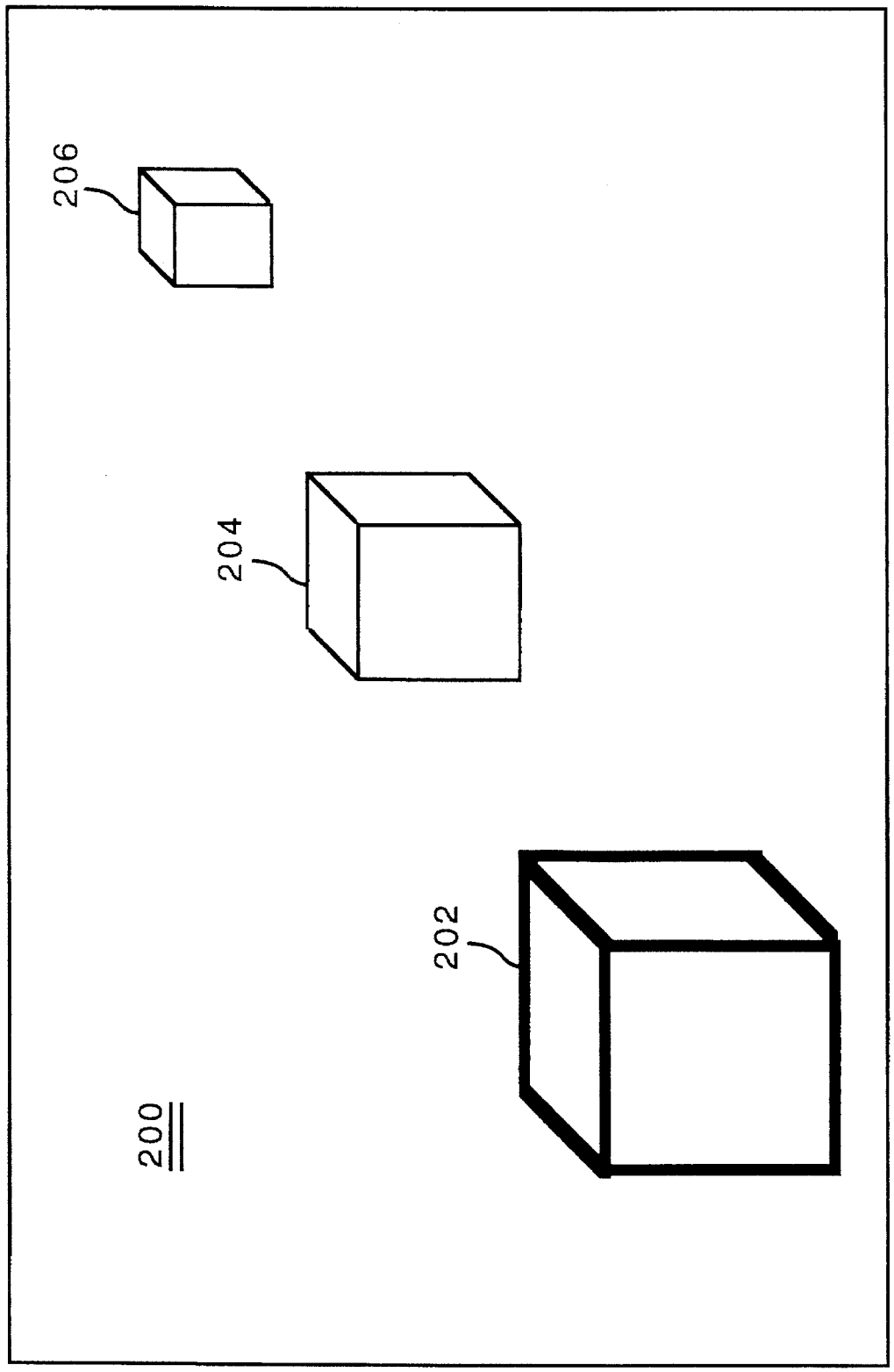

Referring now to FIGS. 8A–8D, graphical representations of a screen 200 of the output device 18 with various views displayed is shown. FIG. 8A illustrates the screen 200 showing a normal view of an image having three objects 202, 204 and 206. The image is displayed without a false contrast and there is no indication to the user which portions of the image are in focus and which are not. FIG. 8B illustrates the screen 200 of the output device 18 showing an image with the focus assist view of the present invention activated. This view indicates that the imaging device 14 is focusing on the middle object 204. This is clearly presented to the user because of the highlighting about the portion of the image that is in focus. While the actual image would show the border of object 204 highlighted in red, the figure shows the borders in bold for demonstration purposes. Assuming the middle object 204 was not of interest to the user, but rather the rightmost object 206 was of interest, the focus could be adjusted manually (or the user could command the auto focus system to focus closer or farther away, or move a selection pointer to the object desired to be in focus) and the focus assist view would provide the user with clear feedback as to when the rightmost object 206 was in focus, such as illustrated in FIG. 8C. The user is able to quickly and easily identify the portion of the image because of the highlight created by combining the false contrast signal with a reduced version of the original image signal. If the leftmost object 202 were in focus, this would be displayed by the focus assist view as shown in FIG. 8D.

While the present invention has been described with reference to certain preferred embodiments, those skilled in the art will recognize that various modifications may be provided. These and other variations upon and modifications to the preferred embodiment are provided for by the present invention which is limited only by the following claims.

What is claimed is:

1. An apparatus for generating a contrast false color overlay as a focus assist from an input signal, the apparatus comprising:

a signal reducer having an input and an output, the input of the signal reducer coupled to receive the input signal, the signal reducer reducing the amplitude of the input signal by a predetermined amount;

an automatic gain control unit having an input and an output for producing a contrast signal whose amplitude is proportional to the contrast in an image, the input of the automatic gain control unit coupled to receive the input signal; and an adder having a first input, a second input and an output for summing two signals, the first input of the adder coupled to the output of the signal reducer, the second input of the adder coupled to the output of the automatic gain control unit.

2. The apparatus of claim 1, wherein said automatic gain control unit also adjusts the amplitude of the contrast signal to a predetermined range.

3. An apparatus for generating a contrast false color overlay as a focus assist from an input signal, the apparatus comprising:

a divider having an input and a plurality of outputs, for dividing the input signal into a plurality of output signals, the input of the divider coupled to receive the input signal;

a combiner having a plurality of inputs and an output for combining a plurality of signals into a single signal; and a signal reducer having a plurality of inputs and at least a first output and a second output, each of the plurality of inputs coupled to a corresponding one of the plurality of outputs of the divider, the signal reducer decreasing the amplitude of each divided input signal by a predetermined amount, the second output of the signal reducer coupled to one of the plurality of inputs of the combiner;

an automatic gain control unit having an input and an output, for producing a contrast signal whose amplitude is proportional to the contrast in an image, the automatic gain control unit coupled to receive one of the plurality of output signals by coupling the input of the automatic gain control unit to one of the plurality of outputs of the divider, and an adder having a first input, a second input and an output for summing two signals, the first input of the adder coupled to the first output of the signal reducer, the second input of the adder coupled to the output of the automatic gain control unit, and the output of the adder coupled to one of the plurality of inputs of the combiner.

4. The apparatus of claim 3, wherein the divider divides the input signal into three channel signals and the combiner combines the three channel signals into the single signal.

5. The apparatus of claim 4, wherein the divider divides the input into one from the group of RGB channels, CMY channels and YUV channels, and the combiner combines the one from the group of RGB channels, CMY channels and YUV channels into the single signal.

6. The apparatus of claim 4, wherein the divider divides the input signal into a red channel signal, a blue channel signal and a green channel signal, and a luminance signal is processed by the automatic gain control unit.

7. The apparatus of claim 2, wherein the predetermined amount by which the signal reducer reduces the amplitude of the input signal is about 50% of an intensity displayable by a display device, and wherein the predetermined range by which the automatic gain control unit adjusts the amplitude of the contrast signal is about 50% of the intensity displayable by the display device.

8. The apparatus of claim 1, wherein the automatic gain control unit includes one from the group of an FIR and IIR high-pass filter for generating the contrast signal whose amplitude is proportional to the contrast in the image.

9. An apparatus for generating a contrast false color overlay as a focus assist from an input signal, the apparatus comprising:

a high pass filter having an input and an output, for differentiating a signal to extract high frequency components and produce a contrast signal, the input of the high pass filter coupled to receive the input signal;

an AGC circuit having an input and an output, for limiting the gain of the contrast signal, the input of the AGC circuit coupled to the output of the high pass filter;

a gain control circuit having an input and an output, for reducing the amplitude of the input signal, the input of the gain control circuit coupled to receive the input signal; and an adder having an first input, a second input and an output, for summing signals applied to the first and second inputs, the first input of the adder coupled to the output of the AGC circuit, the second input of the adder coupled to the output of the gain control circuit.

10. The apparatus of claim 9, wherein the AGC circuit is an automatic gain control circuit and adjusts the contrast signal to match operating parameters of an output device.

11. The apparatus of claim 9, wherein the AGC circuit limits the amplitude of the contrast signal to a first predetermined range of values, and the gain control circuit reduces the amplitude of the input signal to a second predetermined values such that the sum of-the contrast signal and the input signal is within a display range of an output device.

12. The apparatus of claim 9, further comprising a multiplexer having an first input, an second input, an third input and an output, for selectively outputting a signal applied to-the first input or the second input in response to a control signal on the third input, the first input of the multiplexer coupled to receive the input signal, the second input coupled to the output of the adder, and the third input coupled to receive the control signal.

13. A method for displaying a false color contrast overlay as a focus assist on an output device, the method comprising the steps of:

receiving an input signal representing an image;

separating the input signal into channel signals;

receiving a luminance signal;

producing, from the luminance signal, a contrast signal with an amplitude that varies with contrast in the image;

reducing the contrast signal;

reducing the channel signals;

combining the reduced contrast signal with the reduced channel signals to produce a combined signal; and generating the image on the output device using the combined signal.

14. A method for displaying a false color contrast overlay as a focus assist on an output device, the method comprising the steps of:

receiving an input signal representing an image;

separating the input signal into channel signals;

generating a luminance signal;

producing, from the luminance signal, a contrast signal with an amplitude that varies with contrast in the image;

reducing the contrast signal;

reducing the channel signals;

combining the reduced contrast signal with the reduced channel signals to produce a combined signal; and generating the image on the output device using the combined signal.

15. The method of claim 14, wherein the signal representing an image is in RGB format and the combining step adds the reduced contrast signal to a red channel.

16. The method of claim 14, further comprising the steps of:

receiving a signal indicating a view type selection;

determining whether the signal indicating a view type selection is normal; and generating the image on the output device using the received signal representing the image if the view type selection is normal.

17. The method of claim 14, wherein the contrast signal is reduced to range between 0% and 50% of brightness displayable by the output device.

18. The method of claim 14, wherein the channel signals are reduced to range between 0% and 50% of brightness displayable by the output device.

19. The method of claim 14, wherein the contrast signal and the channel signals are each reduced such that their sum is about 100% of a displayable range of the output device.

\* \* \* \* \*